United States Patent
Nikander et al.

[11] Patent Number: 5,846,281
[45] Date of Patent: Dec. 8, 1998

[54] METHOD AND APPARATUS FOR ADJUSTING THE QUENCH HEAD OF GLASS TEMPERING

[76] Inventors: Risto Nikander, Kemiankatu 10, FIN—33720; Jouko Järvinen, Sudenkatu 5 A, FIN—33520, both of Tampere, Finland

[21] Appl. No.: 836,272
[22] PCT Filed: Oct. 24, 1995
[86] PCT No.: PCT/FI95/00585
  § 371 Date: Jul. 1, 1997
  § 102(e) Date: Jul. 1, 1997
[87] PCT Pub. No.: WO96/13465
  PCT Pub. Date: May 9, 1996

[30] Foreign Application Priority Data

Oct. 28, 1994 [FI] Finland ..................... 945082

[51] Int. Cl.⁶ ................................ C03B 27/44
[52] U.S. Cl. .................. 65/114; 65/348; 65/349; 65/351
[58] Field of Search .............. 65/114, 348, 349, 65/351

[56] References Cited

U.S. PATENT DOCUMENTS

| | | | |
|---|---|---|---|
| 4,071,346 | 1/1978 | Schmidt | 65/351 |
| 4,157,910 | 6/1979 | Imler | 65/351 |
| 4,343,645 | 8/1982 | Abe | 65/348 |
| 4,619,683 | 10/1986 | Halbertschmidt et al. | 65/351 |
| 4,711,655 | 12/1987 | Schultz | 65/351 |
| 4,749,401 | 6/1988 | Colmon et al. | 65/114 |
| 4,883,527 | 11/1989 | McMaster et al. | 65/273 |

FOREIGN PATENT DOCUMENTS

| | | |
|---|---|---|
| 0 249 161 | 12/1987 | European Pat. Off. |
| 74935 | 12/1987 | Finland |
| 76313 | 6/1988 | Finland |
| 89902 | 8/1993 | Finland |

*Primary Examiner*—Stanley S. Silverman
*Assistant Examiner*—Sean Vincent
*Attorney, Agent, or Firm*—Pollock, Vande Sande & Priddy

[57] ABSTRACT

A method and apparatus for adjusting a quench head for glass tempering is provided. The quench head comprises at two nozzle blocks, each one of the nozzle blocks comprising at least one nozzle for directing the flow of a substance in gaseous phase to impinge onto the surface of the glass at certain areas. The nozzle blocks are supported on a frame to form at least one row of nozzle blocks. The frame comprises means for adjusting the tempering conditions effected to the surface of the glass to follow the shape of the surface of the glass. The directions of the flows of the substance in gaseous phase is adjusted such that the distance between the areas where a substance impinges the surface of a glass, between at least one pair of adjacent nozzle blocks and at least one row is kept substantially constant, regardless of the shape of the glass.

9 Claims, 4 Drawing Sheets

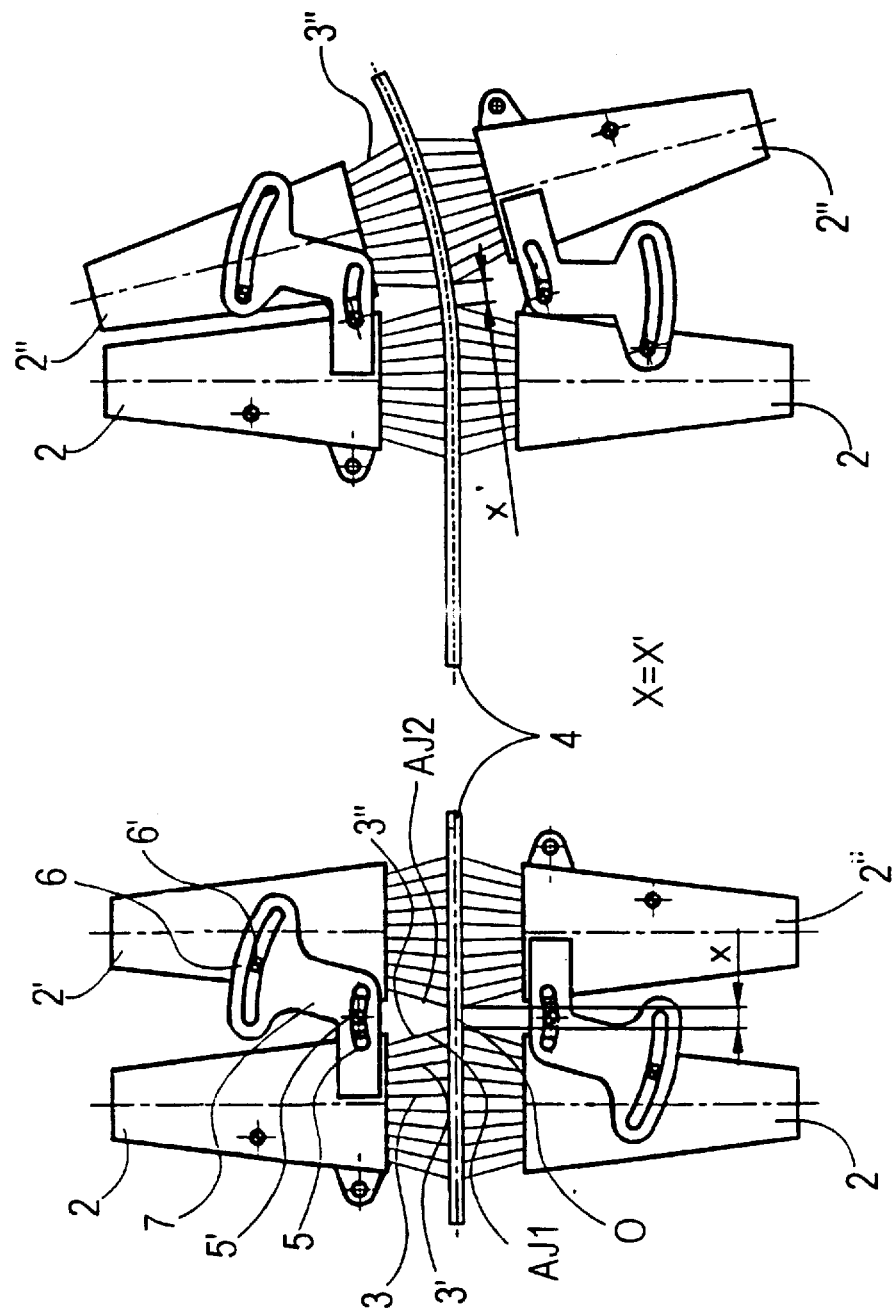

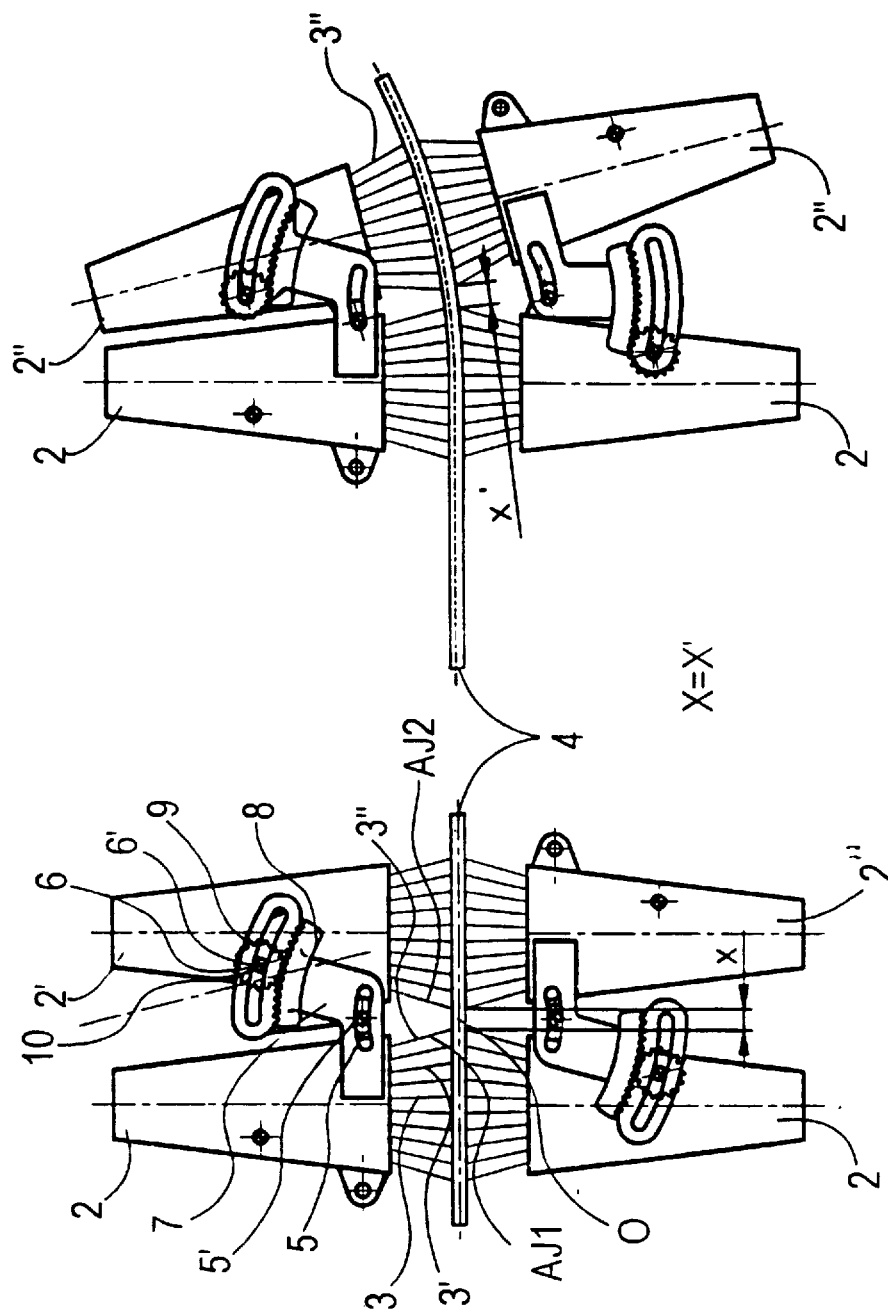

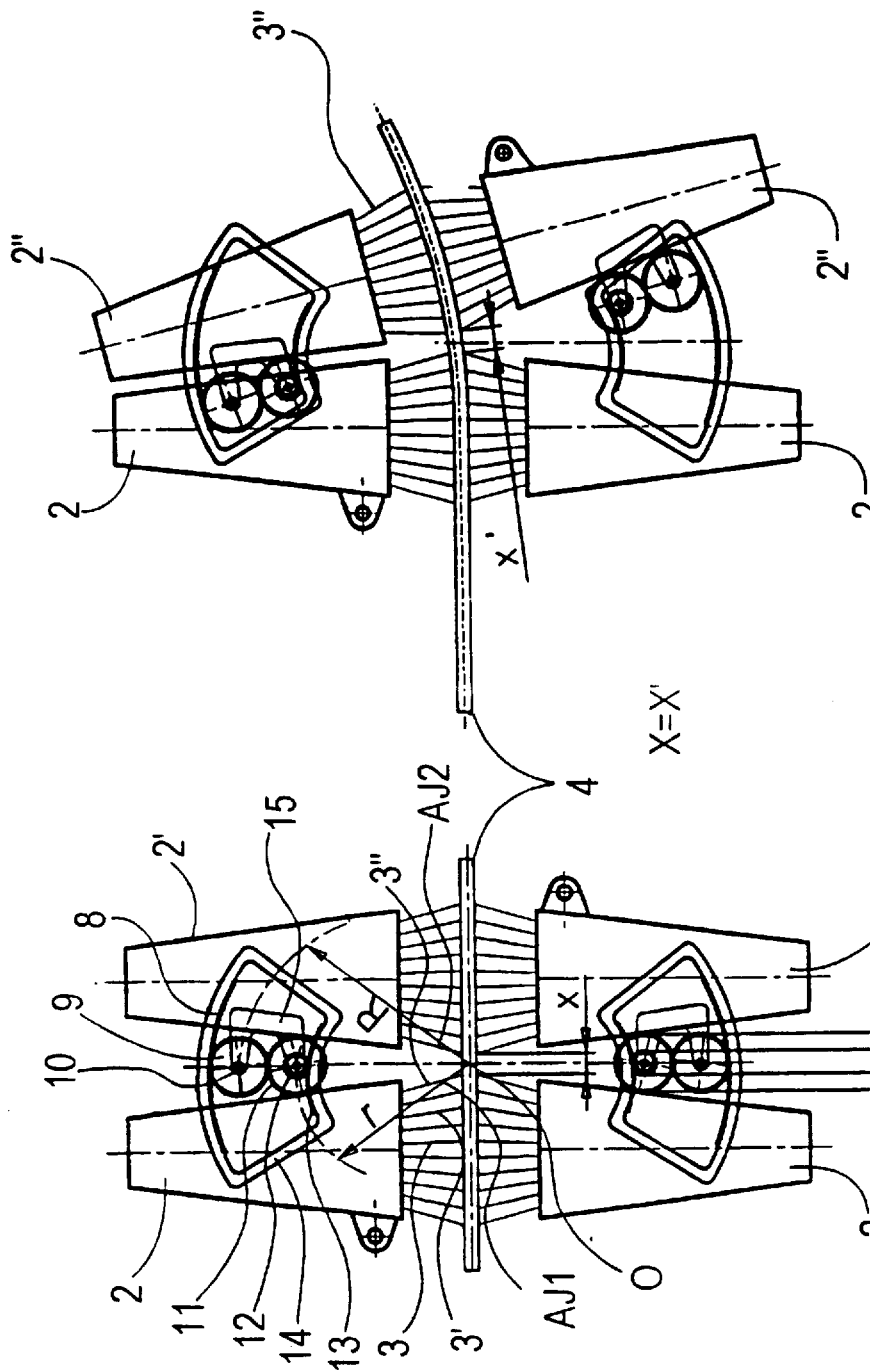

METHOD AND APPARATUS FOR ADJUSTING THE QUENCH HEAD OF GLASS TEMPERING

FIELD OF THE INVENTION

The invention is related to a method for adjusting the quench head of glass tempering apparatus.

BACKGROUND OF THE INVENTION

Glass tempering is almost always performed by flows of substance in gaseous phase specially by air jets. For achieving good tempering results and moderate power consumption it is important, that air jets impinging the glass:

A) are blown from nozzles to the glass from relatively small, preferably from a distance of about 20 mm, B) the distances between of the air jets measured along the surface of the glass, impinging on the glass, are small and regular, typically 10–15 mm only, and C) direction of the air jets impinging on the glass is about perpendicular to the main planar surface of the glass and does not deviate from the perpendicular direction more than 20 degrees.

If the above conditions are not met, the quality of the tempering is not satisfactory although the consumption of the energy is quite high.

For flat tempered glass these conditions are not difficult to achieve, as the quench head is then always flat and fixed and nozzle positions do not need any substantial control or adjustment and thus their position remain unchanged continuously during the tempering process. Also, when the blowing distance is changed, the distance of the whole quench area (glass) from the nozzles changes simultaneously and remains at equal distance from the glass in every single point of impinging.

However, the tempering of glass which has been bent to a certain curvature prior to the tempering phase, is very difficult because the above conditions A–C should be met simultaneously when the quench head should follow the shape of glass. Thus the adjustment to meet the variations of the shape of glass will be decisive factor to achieve good tempering results.

In order to meet the above conditions the prior art suggests as a common practice to make special pair of quench heads for each glass type. This is, however, very expensive as each type of glass needs its own pair of quench heads. Also, the change of quench heads normally involves quite laborious effort, because of their weight and the quench heads need to be fixed properly and the connections have to be air tight.

Another way to meet the above requirements suggested by the prior art in the field is, that the quench head is composed of sections, for instance different size of flat and bent sections with different radiuses. When combining them together, the requirements can also be met to some extent. In this way investment savings are obtained, but the efforts needed to change the quench are even further increased.

The publication FI-76313 relates to a quench which is arranged to follow the shape of the bending conveyor and the quench distance measured from the surface of the glass can be kept constant. This system is based on principle of the bending and further the tempering system can only be adapted on such methods in which the bending and the tempering phases take place in one and the same position.

The glass travels during bending and quenching supported on the roller conveyor, rollers being perpendicular to the glass travel direction. The longitudinal directions of the quench blocks are parallel to the rollers, (perpendicular to the glass travelling direction). The nozzle rows are arranged on the quench block on the whole length of the same.

In this way nozzle distances remain constant all the way from one side of the glass to the other side in perpendicular direction of the glass travelling direction.

In the direction of the glass travel the distance of the nozzle rows between the quench blocks with bending changes, but it is not so harmful because the glass is moving in this direction. Therefore the position of the impingement of the air on to the glass changes continuously and even tempering is achieved.

This kind of system is naturally suitable only for glass bent to cylindrical configuration travelling on the rollers, between the upper and lower quench heads.

Various efforts have been made to develop bending and tempering systems, in which bending and tempering takes place in one and the same place. The quench head must follow the shape of the glass also in these systems.

Typical examples are presented in publications FI-89902 and FI-74935. The teachings of these publications are however, unable to create conditions essential for good quenching results as described earlier. Furthermore, they are very complicated systems.

SUMMARY OF THE INVENTION

It is the purpose of the present invention to provide a method for an adjustable quench head which can be used for tempering of various glass shapes to be used in automotive, interior design and for architectural purposes and maintain good quenching conditions for various shapes of glass to provide tempered glass with high quality.

The method is especially suitable for a great variety of glasses which are for instance cylindrically bent, bent with variable radius and/or consisting of flat or nearly flat and bent sections. The bending of the glass should take place mainly in one plane (dimension) only, but somewhat conical and two dimensional bending configurations are also possible when a minor compromise is accepted with the tempering quality and/or energy consumption.

The method of the invention is suitable for use in connection with all kinds of bending and tempering furnaces in which the glasses are bent by gravity or by pressing, horizontal, vertical or any inclination between horizontal and vertical.

In particular one advantageous construction where the method can be applied as the adjustable quench head has been described in FI-86054. Thus, the method could be used with any bending and tempering systems, e.g. system which carries the glass from furnace on quench ring, supporting the glass along its periphery.

The quench head could also be used with vertical bending and tempering systems, which carry the glass from bending section into the quenching section supported by tong-like elements, (glass is suspended on tongs from its edge and the glass hangs on tongs in vertical position).

The invention is also related to apparatus for adjusting the quench head of glass tempering.

BRIEF DESCRIPTION OF THE DRAWINGS

The invention is more closely explained herebelow with simultaneous reference to the accompanying drawings, in which FIG. 1A is for tempering of flat or nearly flat glass FIG. 1B for tempering of typical automotive backlite; and FIG. 1C for tempering of two automotive sidelites in one batch, and FIGS. 2A, 2B, 3A, 3B, 4A and 4B show the adjustment of two aligned nozzle blocks according to the method, wherein FIGS. 2A–4A show the situation with flat glass and FIGS. 2B–4B show the situation with bent glass.

DETAILED DESCRIPTION OF THE PREFERRED EMBODIMENT(S)

Figure 1A:
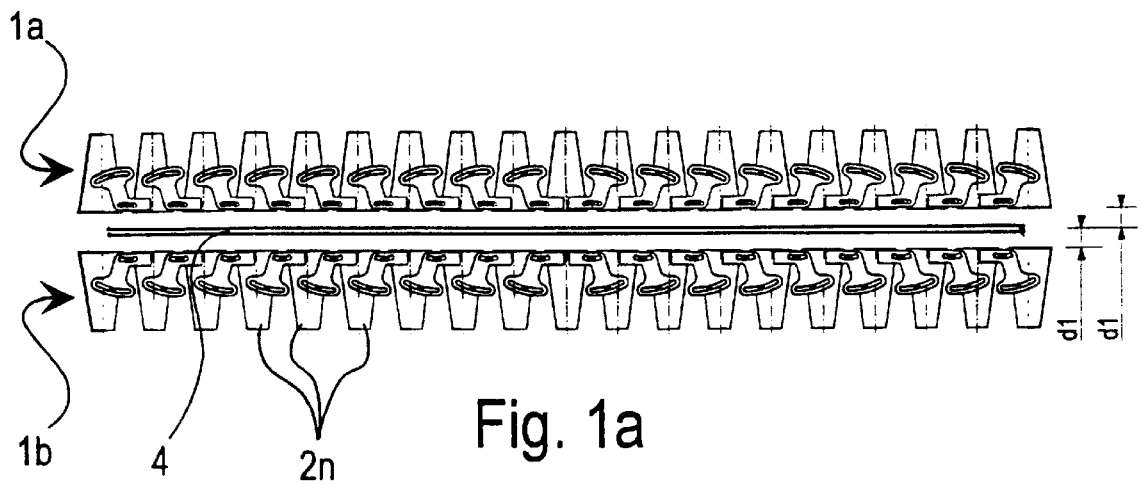
FIGS. 1A, 1B and 1C shows three typical adjustable quench heads of one embodiment of the invention.

The quench system comprises two quench heads, the upper one 1a and the lower one 1b on the opposite sides of the glass 4 to be tempered. Both of them consists of at least one or typically multiple nozzle blocks 2n (further comprising individual nozzles) in rows substantially in the direction parallel to the direction of the travel path of the glass. These nozzle blocks 2n are supported on the frame on structures, which allow individual nozzle blocks 2n to be adjusted vertically and horizontally also thus facilitating the adjustment of the inclination. The supporting structures which are known to a person skilled to the art have not been shown in order to make the basic principle of the present invention more clear and understandable.

Typically, the quench head comprises one or several rows of the nozzle blocks. The nozzle blocks 2n have one or several rows of nozzles machined on the surface facing the glass and the nozzle rows in each or same nozzle block 2n are typically machined in such a way, that the center nozzle row impinges the air jet substantially perpendicular to the main planar surface of the glass and the ones on each side at larger and larger angles with regard to the perpendicular direction as shown in more detail in FIG. 2, as air jets 3, 3' and 3". Thus the points where the air jets of a certain nozzle block 2n impinge the surface of the glass form a certain area, normally a rectangular area.

The adjustment of the nozzle blocks according to the glass contour or shape is effected by intermediate members 7 connecting at least some, preferably all the adjacent nozzle blocks together, one advantageous structure being a gliding hinge system. However, as seen in FIG. 2A, distance x taken along the surface of the glass between the impingement points of the air jets from the adjacent nozzles AJ1 and AJ2 of adjacent nozzle blocks 2, 2' is optimum only in flat condition of the glass, the same distance in concave side would increase, and on convex side would decrease when tempering curved glass.

The purpose of this invention is to maintain dimension x at optimum level in spite of the inclination adjustment of the nozzle blocks needed for the curvature of the glass. The automatic principle makes it possible to avoid accurate and difficult manual adjustments.

The same automatic principle can be effected whether the actual inclination adjustment is made manually, mechanically or with automatic computer controlled system.

The system provides various advantages to the user such as;

1. The blowing distance can be maintained constant if needed.

The blowing distance can be maintained relatively short and equal for all kinds of glasses whether they are flat or bent, consisting of one radius, variable radiuses, or combinations of flat and bent surfaces with one or more radiuses or variable radiuses.

Figure 1B:
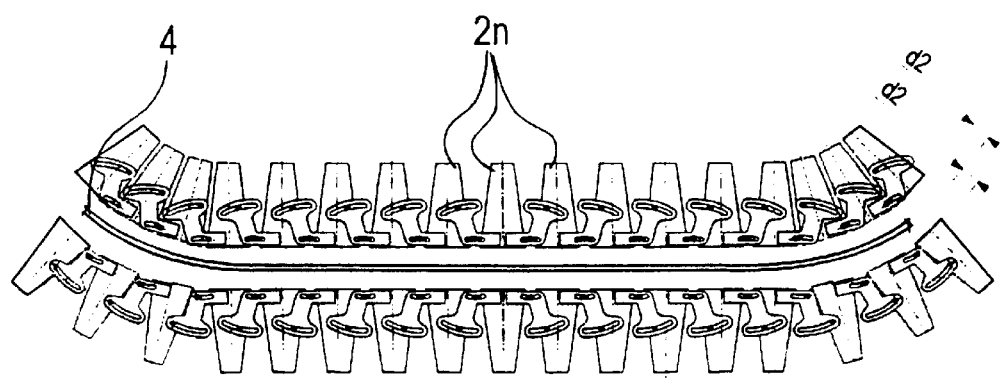
Figure 1C:
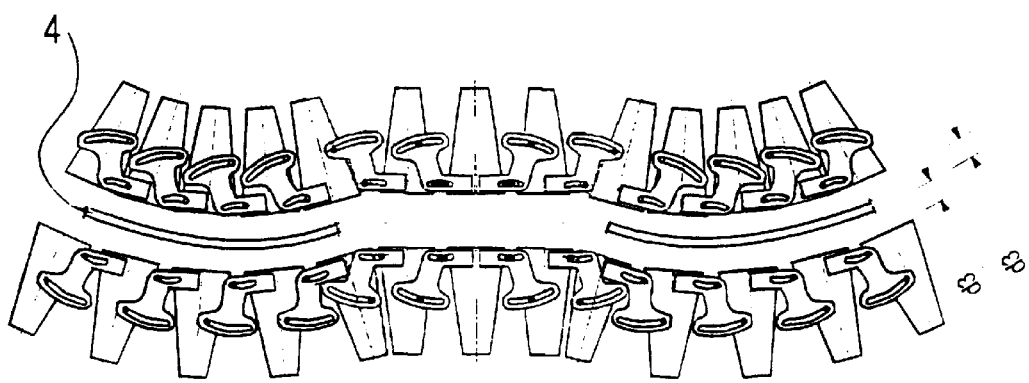

Thus the distances d1=d2=d3 in FIG. 1A–C are the same, wherein d1, d2, d3 are the straight distances between the nozzle block foreheads and the surface of the glass at the nozzle block.

2. The blowing pattern can be always selected as the optimal one.

The blowing distance of two subsequent nozzle rows remain quite accurately constant whether the glass is flat, bent to any radius between flat and minimum radius or with variable radiuses or combinations of them.

Thus in FIG. 2, x=x', wherein x and x' are the distance between the air jets AJ1 and AJ2 explained hereabove regardless of the nature of the shape of the glass, when the radius adjustment of the quench head is made, the blowing distance of successive nozzle rows between two successive or adjacent nozzle block is maintained automatically.

This reduces needs of adjustments, makes the adjustment quick and eliminates one error possibility thus increasing yields obtained.

3. The one and only quench can temper a great number of different glass types. Only most complex glasses such as conically or fairly strongly 3-dimensionally bent glasses need to have special quench heads which better conform to the special glass shape. The use of only one quench greatly reduces number of different quench heads needed for different types of glasses and further eliminates the need for manufacture, store and change.

4. The glass quality and yields are improved, simultaneously with savings of energy Highly adjustable quench head, which can be adjusted to the size and shape of the glass and maintains the nozzle pattern and blowing distance constant improves glass quality, reduces breakage of glass in tempering and eliminates the need of using excessive motor sizes in the quenching blowers.

With reference to drawings the quench head 1 consists of several nozzle blocks 2n, each of the nozzle blocks having one or more rows of nozzles, to the overall size and shape of glass 4. During the adjustment each individual nozzle block 2' (FIG. 2A) is adjusted in relation to the frame of the quench head and optionally with relation to the adjacent nozzle block 2 to position 2" (FIG. 2B) in order to follow the change of the shape of glass 4. The nozzle block 2' simultaneously slides to a new position 2" on the concave side of the glass towards the successive or adjacent nozzle block 2 and on the convex side outwards of the adjacent nozzle block 2 so that the air jets impinge on the glass at equal distances x=x' (FIG. 2A FIG. 2B). Thus by installing several nozzle blocks 2n one following another complete glass shapes can be followed and complete quench heads, top 1a and bottom 1b (FIG. 1), can be made to conform the shape of glass 4 maintaining the quenching pattern, quench nozzle distance d (d1=d2=d3/FIG. 1) and air jet direction on to the surface of the glass 4 substantially the same.

The individual nozzle blocks 2, 2' are joined one to another by a flexible connection means such as slide, wheel, lever and joints or gear which allow the nozzle blocks 2, 2' to be moved closer or further from each other, this movement always being actuated by another set of slide(s), wheel(s), lever(s) and joints of gear(s) which take the actuating force from the change of the inclination of the nozzle block 2' 2" (FIG. 2A FIG. 2B) in relation to the adjacent nozzle block 2. In the combination of two adjacent nozzle blocks 2, 2' the first nozzle block 2 comprises a projecting member 7 with a first curved slide 5 or groove in which the first pin 5' or the like of the second nozzle block 2' is placed to be moved along the longitudinal direction of the first curved slide 5 or groove during the adjustment phases. The projecting member 7 further comprises a second curved slide 6 or groove in which the second pin 6' or the like of the second nozzle block 2' is placed to be moved along the longitudinal direction of the second curved slide 6 during the adjustment phases. The projecting member 7 in the first nozzle block 2 is a plate-like element, the main plane of which is in the longitudinal direction of the row of nozzle blocks substantially perpendicular with regard to the main planar surface of the glass and placed substantially beside the second nozzle block 2'. The first curved slide 5 crosses or goes over the distance x and projects on both sides of the distance x at the central or middle position of the adjacent nozzle blocks 2, 2', the first pin 5' or the like being at the central portion of the first curved slide 5 or the like, thus substantially defining the position to quench flat glass, wherein the second curved slide 6 or the like is simultaneously at the second nozzle block 2, the pin 6' being in the central position. The combination described hereabove forces the nozzle block 2' to another position in relation to the nozzle block 2 as the inclination of the nozzle block 2' is altered, thus maintaining the distance x constant at any relative inclination within maximum and minimum distance between the nozzle blocks 2 and 2'.

Thus the distance (x x') is kept constant by means 5, 5', 6, 6', 7 combining two motions of the nozzle block 2" with regard to the adjacent nozzle block 2, the motions being (a) inclining the nozzle block 2" with regard to the adjacent nozzle block 2 and (b) moving the nozzle block 2" in the longitudinal direction of the row of the nozzle blocks.

FIG. 3 shows a second embodiment of the apparatus, which has some further advantageous features for the adjustment. A bent gear rack 8 solidly mounted on the nozzle block 2 (FIG. 3A) and following the shape of curved slide 6 shown in FIG. 2 is mounted in connection with the projecting member 7, which is solidly mounted on the adjacent nozzle block 2. Gear wheel 9 is assembled on shaft centrally to pin 6', solidly mounted on nozzle block 2' and its teeth engage with the gear rack 8. By providing the gear wheel 9 with turning means, the adjustment can be made by the gear construction 8, 9.

The gear construction 8, 9 must be installed on both ends of the nozzle blocks 2, 2'. Thus two persons, one on each end, working manually and simultaneously can make the adjustment of the nozzle blocks 2, 2' one by one from the position of FIG. 3A to the adjusted position shown in FIG. 3B e.g. the nozzle blocks 2". The curvature of the bent gear rack 8 can define the line of movement of nozzle block 2' in relation to nozzle block 2, in which case slide 6 and pin 6' can be eliminated from the construction.

To make adjustment even more feasible and in order to avoid or diminish the manually operated phases, it is possible to mount the gear wheels 9 in the opposite ends of nozzle block 2 together with a common shaft 10 uniting the pins 6' with wheels 9. The shaft 10 can rotate on bearings mounted on the nozzle block 2' and which extend from the first end of the nozzle block to the other end of the same. Now turning of one gear wheel 9 on either end of the shaft 10 turns the other gear wheel in the other end an equal amount.

A one third embodiment of the apparatus is shown in FIG. 4. The adjacent air jets AJ1 and AJ2 impinging the surface of the glass from two adjacent nozzle blocks 2, 2' on two sides of origin O define the adjustment movement of the nozzle block 2' (tilting and sliding). This adjustment movement is related to two radiuses, R and r drawn from the origin O which define the movement of nozzle block 2' (FIG. 4A) when moved to position 2" (FIG. 4B). The gear racks 8 and the gear wheels 9 on both ends of the nozzle block 2' and their intermediate shaft 10 provide the same function already explained in connection with reference to FIG. 3.

Additional gear wheels 11 are mounted on shafts on both ends of the nozzle block 2', fixed on nozzle block 2', at the distance or radius r from the origin, and they engage with gear wheels 9. In addition, centrally and solidly with gear wheels 11, smaller gear wheels 12 are mounted on both ends of the nozzle block 2'. These smaller gear wheels 12, in turn, engage with racks 13, solidly mounted on nozzle block 2. The gear racks 8 and 13 are mounted on a projecting member in the nozzle block 2. The projecting member 14 has two curved parts radially at different distances, the parts providing support for the gear racks 8, 13. Further, the gear wheels 9, 11 and 12 have been mounted on a U-shaped frame 15 fixed solidly in the nozzle block 2'.

When radiuses (R=the distance between the origin O and the center of the gear wheel 9, and r=the distance between the origin O and the center of the gear wheels 11 and 12, the origin O being the point of the middle of the thickness of the glass between the impinging air jets AJ1 and AJ2) and gear wheel diameters have the certain dimensional relation, it is possible to achieve the desired movement. For instance the larger gear wheels 9 and 11 have the same diameter and R/r=D/d, wherein D=the diameter of the larger gear wheels 9 and 11 and d=the diameter of the smaller gear wheel 12. Now, when any of the gear wheels is rotated, it causes exactly the desired adjustment movement, which is forced, not liable to jamming, and is accurate.

Further, one advantageous feature of the invention is provided by adjusting the quantity of the air jets impinging the surface of the glass sheet. Thus, the area of the quenching can be patterned in a way that the degree of the quenching is different at the different areas of the glass sheet in zone tempered glasses. The patterned quenching is useful especially in connection with glass panes for cars, especially for windscreens, wherein the edge parts of the glass can be quenched to a higher degree than the middle part of the glass, thereby providing better optical qualities for the glass at the middle section also in breakage situations.

We claim:

1. A method of adjusting a quench head comprising at least two nozzle blocks, each nozzle block comprising at least one nozzle for directing the flow of a substance in gaseous phase to impinge a surface of glass, said nozzle blocks being supported on a frame to form at least one row of nozzle blocks, said frame comprising means for adjusting tempering conditions applied to the surface of the glass to follow the shape of surface of the glass, said method comprising the steps of:

adjusting the direction of flow of said substance onto said surface of said glass by inclining one of said nozzle blocks with respect to an adjacent one of said nozzle blocks and moving said one of said nozzle blocks in a longitudinal direction of said row of nozzle blocks whereby a distance between areas where said substance impinges said surface of said glass is kept substantially constant between at least one pair of adjacent nozzle blocks in at least one row, regardless of the shape of the glass.

2. The method of claim 1 wherein said nozzle blocks are arranged on both sides of said glass and further comprising the step of, when said one of said nozzle blocks is adjusted, forcing said one of said nozzle blocks to simultaneously move to a new position on a concave side of said glass towards said adjacent nozzle blocks and on a convex side of said glass away from said adjacent nozzle block so that air jets impinge on the glass at equal distances on both sides of the glass.

3. An apparatus for adjusting a quench head comprising multiple nozzle blocks, each one of said nozzle blocks comprising at least one nozzle for directing the flow of a substance in gaseous phase to impinge onto a surface of glass at certain areas, said nozzle blocks being supported on a frame to form at least one row of nozzle blocks, said frame comprising first means for adjusting tempering conditions to follow contours of the surface of the glass, said apparatus comprising:

second means for inclining one of said nozzle blocks with respect to an adjacent nozzle block and for moving said one of said nozzle blocks in the longitudinal direction of said row of nozzle blocks, whereby a distance between the areas where the substance impinges the surface of the glass, between at least one pair of nozzle blocks, is kept substantially constant.

4. Apparatus according to claim 3 wherein said second means comprises, for a combination of two adjacent nozzle blocks, comprising a first and a second nozzle block a projecting member with a first curved slide in which a first pin of the second nozzle block is movable along the longitudinal direction of the first curved slide during adjustment, the projecting member further comprising a second curved slide in which a second pin of the second nozzle block is movable along the longitudinal direction of the second curved slide during adjustment.

5. Apparatus according to claim 4 wherein the projecting member in the first nozzle block is a plate-like element, the main plane of which is substantially perpendicular with regard to the longitudinal direction of the row of nozzle blocks and substantially perpendicular with regard to the main planar surface of the glass and is placed substantially adjacent to the second nozzle block.

6. Apparatus according to claim 4 wherein the first curved slide is placed to cross the distance such that the first curved slide projects at both sides of a central position between the adjacent nozzle blocks, the first pin being at a central portion of the first curved slide, thus substantially defining the position to quench flat glass.

7. Apparatus according to claim 6 wherein the second curved slide is substantially at the second nozzle block and the second pin is also in a central portion of said second slide when said first pin is at said central portion of said first curved slide.

8. Apparatus according to claim 3 wherein, said second means comprises, for a combination of two adjacent nozzle blocks comprising a first and second nozzle block,, on the first nozzle block a curved first gear rack in connection with a projecting member and on the second nozzle block a first gear wheel in connection with a second pin, the first gear rack and the first gear wheel together forming a first gear construction by means of which the position of said two adjacent nozzle blocks can be adjusted with regard to each other.

9. Apparatus according to claim 8 further comprising a second gear construction arranged between the combination of two adjacent nozzle blocks, wherein a second gear rack is arranged at a small distance(r) from an origin defined by the point of the middle of thickness of the glass between impinging adjacent air jets in the adjacent nozzle blocks than the first gear rack having a distance (R) from the said origin, wherein a second gear wheel is a combined double gear wheel comprising a smaller gear wheel being connected to the second gear rack and a larger gear wheel being connected to the first gear wheel of the first gear construction, and wherein the gear wheels fulfill the conditions that the larger gear wheel and the first gear wheel have the same diameter and R/r=D/d, wherein D=the diameter of the larger gear wheel and d=the diameter of the smaller gear wheel.

* * * * *